(12) United States Patent
Gouji et al.

(10) Patent No.: US 9,277,621 B2
(45) Date of Patent: Mar. 1, 2016

(54) LIGHT EMITTING SYSTEM, LIGHT EMISSION CONTROL APPARATUS AND CONTROL METHOD THEREFOR, COMMUNICATION SYSTEM AND CONTROL METHOD THEREFOR AND STORAGE MEDIUM

(71) Applicant: CANON KABUSHIKI KAISHA, Tokyo (JP)

(72) Inventors: Kazunori Gouji, Kawasaki (JP); Junji Takai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 516 days.

(21) Appl. No.: 13/748,787

(22) Filed: Jan. 24, 2013

(65) Prior Publication Data
US 2013/0193853 A1 Aug. 1, 2013

(30) Foreign Application Priority Data

Feb. 1, 2012 (JP) ................................. 2012-020311
Dec. 11, 2012 (JP) ................................. 2012-270708

(51) Int. Cl.
*G03B 15/05* (2006.01)
*H04N 5/222* (2006.01)
*H05B 37/02* (2006.01)
*H04N 5/225* (2006.01)

(52) U.S. Cl.
CPC ............ *H05B 37/02* (2013.01); *H05B 37/0272* (2013.01); *G03B 15/05* (2013.01); *H04N 5/2256* (2013.01)

(58) Field of Classification Search
CPC .............................. G03B 15/05; H04N 5/2256
See application file for complete search history.

(56) References Cited

U.S. PATENT DOCUMENTS

| 4,125,766 | A | * | 11/1978 | Holtje ..................... 250/214 SF |
| 4,402,589 | A | * | 9/1983 | Kawamura et al. ........... 396/201 |
| 4,705,373 | A | * | 11/1987 | Ohmori ........................ 396/203 |
| 5,111,233 | A | * | 5/1992 | Yokonuma et al. .......... 396/206 |
| 6,404,987 | B1 | | 6/2002 | Fukui |
| 2009/0185797 | A1 | | 7/2009 | Ogasawara |
| 2013/0128101 | A1 | * | 5/2013 | Midorikawa et al. ......... 348/371 |

FOREIGN PATENT DOCUMENTS

| JP | 2002-247158 A | 8/2002 |
| JP | 2010-252041 A | 11/2010 |
| JP | 2010-259135 A | 11/2010 |

OTHER PUBLICATIONS

Chinese Office Action issued in corresponding application No. 201310028794.8 on May 28, 2015.

\* cited by examiner

*Primary Examiner* — WB Perkey
(74) *Attorney, Agent, or Firm* — Carter, DeLuca, Farrell & Schmidt, LLP

(57) ABSTRACT

A light emitting system in which a light emission control apparatus wirelessly communicates with at least one controlled light emitting apparatus, the controlled light emitting apparatus comprising a first transmission unit which wirelessly transmits charging state information to the light emission control apparatus, and the light emission control apparatus comprising a receiving unit which receives the charging state information from the controlled light emitting apparatus, an informing unit which informs the image capture apparatus that a charging operation is complete, a second transmission unit which transmits a signal to stop transmitting charging state information, and a third transmission unit which transmits a light emission command to the controlled light emitting apparatus.

14 Claims, 13 Drawing Sheets

LIGHT EMITTING SYSTEM, LIGHT EMISSION CONTROL APPARATUS AND CONTROL METHOD THEREFOR, COMMUNICATION SYSTEM AND CONTROL METHOD THEREFOR AND STORAGE MEDIUM

BACKGROUND OF THE INVENTION

1. Field of the Invention

The present invention relates to a technique of controlling light emission by a light emitting apparatus.

2. Description of the Related Art

In recent wireless communication systems, it is possible to exchange various kinds of information by bi-directional communication. Japanese Patent Laid-Open No. 2010-259135 discloses a technique of acquiring the charging state information of each device.

When wireless multiple flash control is performed using a plurality of flashes, for example, a user may be informed of the charging state of each flash using a bi-directional wireless communication system. In wireless multiple flash control, however, it is necessary to exchange charging state information in a shooting sequence, thereby requiring consideration of the timing of communication in the shooting sequence.

SUMMARY OF THE INVENTION

The present invention has been made in consideration of the above problem. In controlling a light emitting apparatus, a communication collision is prevented to appropriately control a flash.

According to the first aspect of the present invention, there is provided a light emitting system in which a light emission control apparatus that is communicable with an image capture apparatus, and transmits a light emission command to at least one other light emitting apparatus wirelessly communicates with at least one controlled light emitting apparatus that emits light in response to a light emission command from another apparatus, the controlled light emitting apparatus comprising a first transmission unit which wirelessly transmits charging state information about a charging state of the controlled light emitting apparatus itself to the light emission control apparatus, and the light emission control apparatus comprising a receiving unit which receives the charging state information from the controlled light emitting apparatus, an informing unit which informs the image capture apparatus that a charging operation is complete, a second transmission unit which transmits, to the controlled light emitting apparatus, a signal to stop transmitting the charging state information, and a third transmission unit which transmits a light emission command to the controlled light emitting apparatus in response to an instruction from the image capture apparatus, wherein if the receiving unit receives, from all controlled light emitting apparatuses, charging state information indicating that a charging operation is complete, the informing unit informs that a charging operation is complete, and the second transmission unit transmits a signal to stop transmitting charging state information.

According to the second aspect of the present invention, there is provided a light emission control apparatus which is communicable with an image capture apparatus, and wirelessly communicates with at least one controlled light emitting apparatus for emitting light in response to a light emission command, comprising: a receiving unit which receives charging state information about a charging state of the controlled light emitting apparatus from the controlled light emitting apparatus; a first transmission unit which transmits, to the controlled light emitting apparatus, a signal to stop transmitting charging state information; and a second transmission unit which transmits a light emission command to the controlled light emitting apparatus in response to an instruction from the image capture apparatus, wherein if the receiving unit receives, from all controlled light emitting apparatuses, at least charging state information indicating that a charging operation is complete, the first transmission unit transmits a signal to stop transmitting charging state information.

According to the third aspect of the present invention, there is provided a communication system in which a control apparatus that is connectable with an image capture apparatus, and transmits an operation command to at least one controlled apparatus wirelessly communicates with at least one controlled apparatus that executes a predetermined operation in response to an operation command from another apparatus, the controlled apparatus comprising a first transmission unit which wirelessly transmits status information about a status of the controlled apparatus itself to the control apparatus, and the control apparatus comprising a receiving unit which receives the status information from the controlled apparatus, an informing unit which informs the image capture apparatus that operation preparation is complete, a second transmission unit which transmits, to the controlled apparatus, a signal to stop transmitting the status information, and a third transmission unit which transmits an operation command to the controlled apparatus in response to an instruction from the image capture apparatus, wherein if the receiving unit receives, from all controlled apparatuses, status information indicating that operation preparation is complete, the informing unit informs that operation preparation is complete, and the second transmission unit transmits a signal to stop transmitting the status information.

According to the fourth aspect of the present invention, there is provided a method of controlling a light emission control apparatus which is connectable with an image capture apparatus, and wirelessly communicates with at least one controlled light emitting apparatus for emitting light in response to a light emission command, the method comprising: a receiving step of receiving charging state information about a charging state of the controlled light emitting apparatus from the controlled light emitting apparatus; a first transmission step of transmitting, to the controlled light emitting apparatus, a signal to stop transmitting charging state information; and a second transmission step of transmitting a light emission command to the controlled light emitting apparatus in response to an instruction from the image capture apparatus, wherein if at least charging state information indicating that a charging operation is complete is received from all controlled light emitting apparatuses in the receiving step, a signal to stop transmitting charging state information is transmitted in the first transmission step.

According to the fifth aspect of the present invention, there is provided a control method for a communication system in which a control apparatus that is connectable with an image capture apparatus, and transmits an operation command to at least one controlled apparatus wirelessly communicates with at least one controlled apparatus that executes a predetermined operation in response to an operation command from another apparatus, the method comprising: a first transmission step of causing the controlled apparatus to wirelessly transmit status information about a status of the controlled apparatus itself to the control apparatus; a receiving step of causing the control apparatus to receive the status information from the controlled apparatus; an informing step of causing the control apparatus to inform the image capture apparatus that operation preparation is complete; a second transmission step of causing the control apparatus to transmit, to the controlled apparatus, a signal to stop transmitting the status information; and a third transmission step of causing the control apparatus to transmit an operation instruction to the controlled apparatus in response to an instruction from the image capture apparatus, wherein if the control apparatus receives, from all controlled apparatuses in the receiving step, status information indicating that operation preparation is complete, the image capture apparatus is informed in the informing step that operation preparation is complete, and a signal to stop transmitting the status information is transmitted in the second transmission step.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

(First Embodiment)

Figure 1:
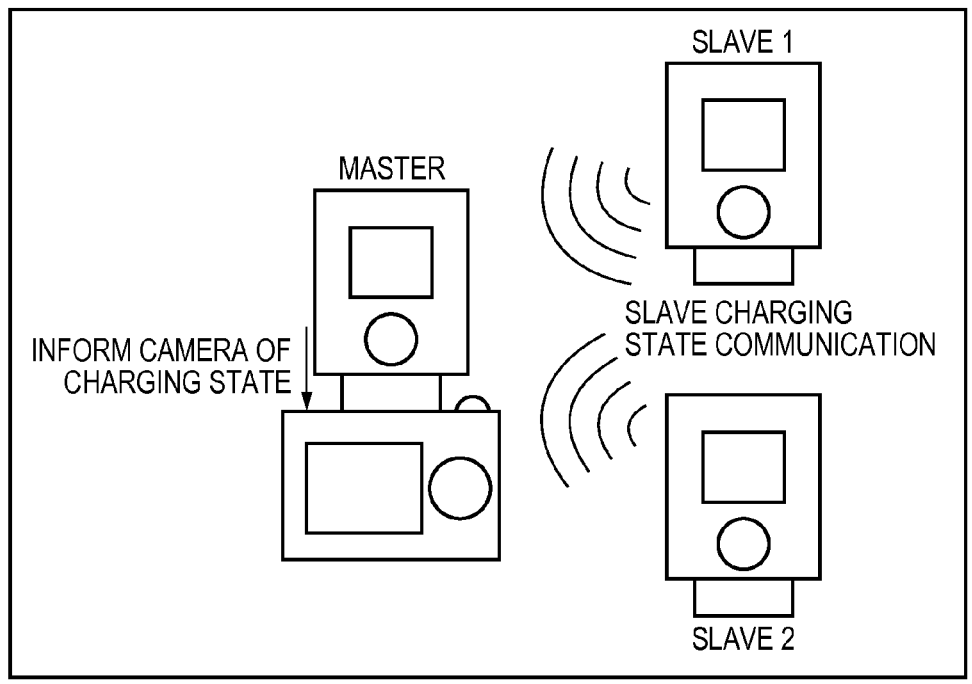
FIG. 1 is a schematic view showing charging state management in a wireless multiple flash system.

FIG. 1 is a schematic view showing a flash system as an example of a light emitting system according to the first embodiment of the present invention. The system includes a master flash connected with a camera, and two slave flashes 1 and 2. The master flash is an example of a control light emitting apparatus, and the slave flash is an example of a controlled light emitting apparatus. The master flash is connectable with the camera, and is communicable with the camera and the slave flashes 1 and 2. The slave flashes 1 and 2 are not directly connectable with the camera. To inform the camera of the charging state information of the slave flashes 1 and 2, the slave flashes 1 and 2 transmit their charging state information to the master flash (an example of the first transmission operation), and then the master flash informs the camera of the charging state information. This is the basic outline of the system in this embodiment.

Figure 2:
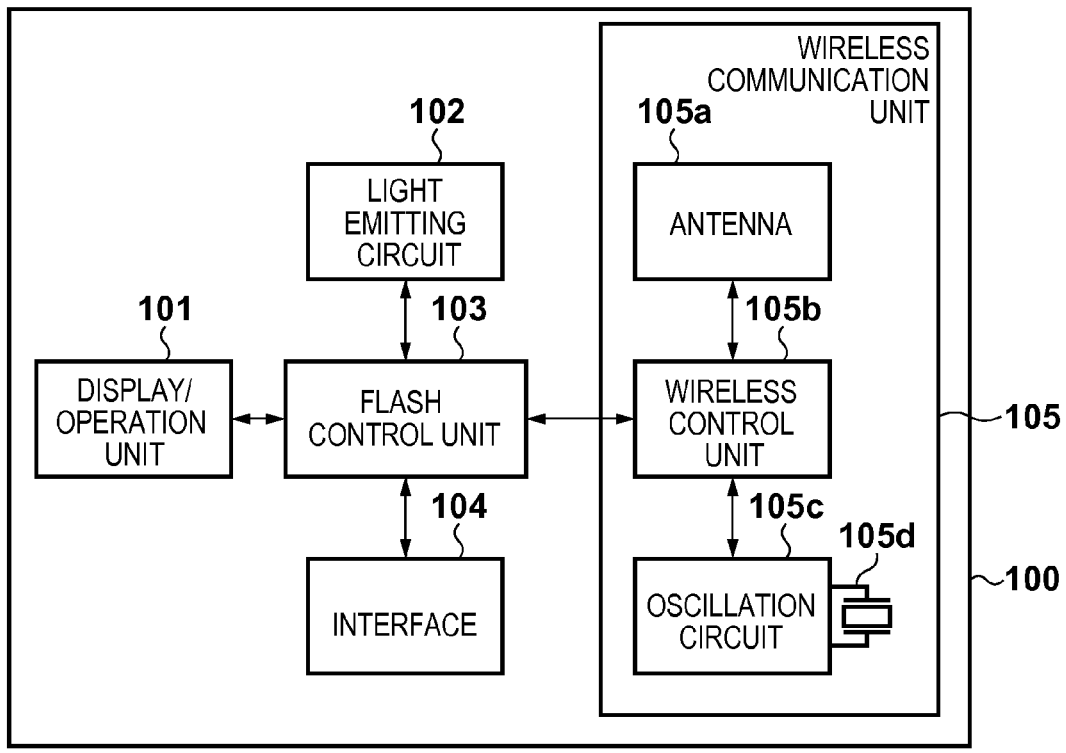
FIG. 2 is a system block diagram showing the hardware arrangement of a flash to undergo wireless multiple flash control.

FIG. 2 is a schematic block diagram showing the arrangement of a flash 100 as an accessory of an image capture apparatus according to the first embodiment of the present invention. Note that in addition to a so-called digital camera mainly having an image capture function, a so-called camera-equipped mobile phone and camera-equipped tablet device may be used as an image capture apparatus.

The flash 100 serves as a flash according to the embodiment of the present invention. Reference numeral 101 denotes a display/operation unit of the flash 100. The display/operation unit 101 sends an operation instruction to a flash control unit 103 to control the flash 100. Furthermore, the display/operation unit 101 includes a shooting instruction unit for sending a shooting instruction. When a shooting operation is instructed, the display/operation unit 101 can transmit shooting instruction information to a master flash via a wireless communication unit 105 (to be described later). Note that the display/operation unit 101 is not necessarily formed by one device. The display unit and operation unit of the unit 101 may be respectively formed by different members such as a liquid crystal display and various buttons/keys, or a touch panel may serve as both the display unit and the operation unit.

Reference numeral 102 denotes a light emitting circuit, which performs control operations associated with light emission such as a charging control operation and light emission control operation, and emits light upon receiving a signal representing a light emission command from the flash control unit 103. The light emitting circuit 102 also transmits a signal representing completion of charging to the flash control unit 103. The flash control unit 103 (an example of a determination unit) controls the flash with the above arrangement. The control unit also controls a calculation operation for flash control or an operation of storing setting values. Reference numeral 104 denotes an interface with the camera. The flash communicates with the camera via the interface 104.

Reference numeral 105 denotes a wireless communication unit included in the flash 100. There are two types of wireless communication units 105. One is a wireless communication unit 105 built into the flash 100, and the other is a detachable wireless communication unit 105 as a separate device. For a separate device, assume, for example, that a card serving as the wireless communication unit 105 is used and a card slot is provided in the flash 100. In this embodiment, the wireless communication unit 105 is built in the flash. Note that a wireless LAN, Bluetooth, Zigbee, or the like can be used as a wireless communication method, or other communication methods using these frequency bands may be used. Reference numeral 105*a* denotes an antenna 105*a*, which performs wireless communication transmission/reception, and transmits, to a wireless control unit 105*b*, data received from a communication partner. The antenna 105*a* also receives data from the wireless control unit 105*b*, and transmits it to the communication partner. Reference numeral 105*c* denotes an oscillation circuit, which shapes the waveform of a clock signal generated by a crystal oscillator 105*d* connected with it, and outputs the shaped clock signal to the respective circuits of the wireless communication unit 105, thereby synchronizing them.

Figure 3:
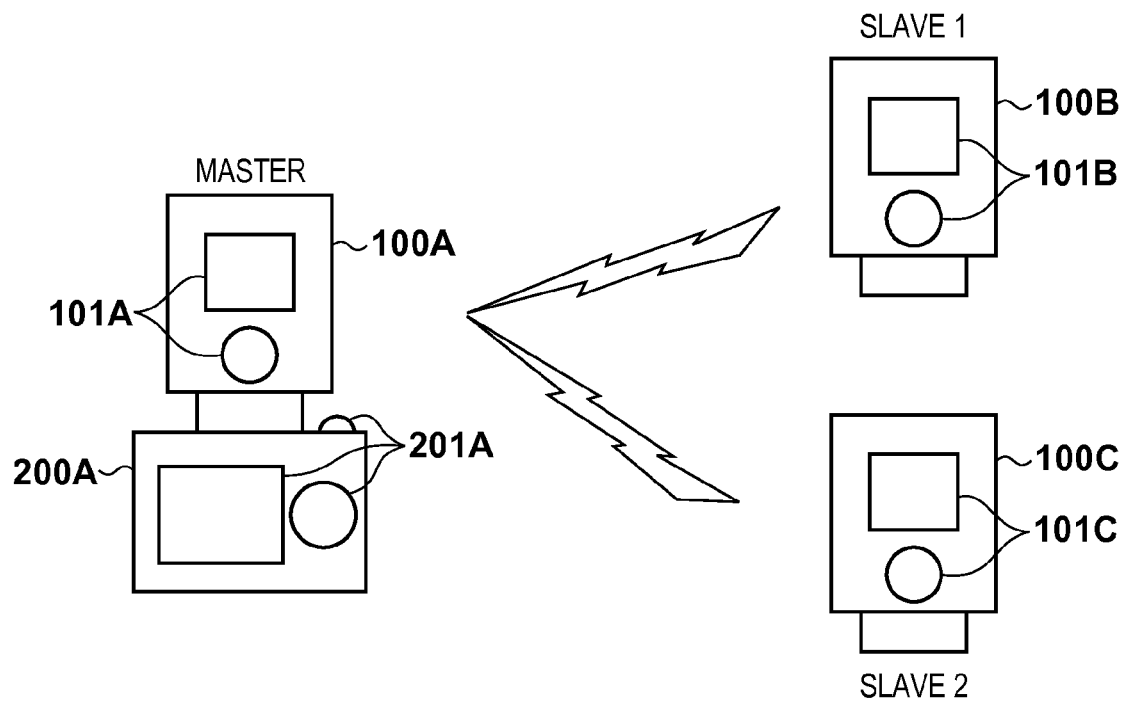
FIG. 3 is a view showing the arrangement of a camera, a master flash, and slave flashes according to the first embodiment.

FIG. 3 is a schematic view showing the system in which a flash 100A is wirelessly connected with flashes 100B and 100C. The flash 100A serves as a master flash, and the flashes 100B and 100C serve as slave flashes. A camera 200A and the flash 100A are physically connected with each other via an accessory shoe, and perform communication via an interface 104. Note that although the flash 100A is an accessory of the camera 200A in the embodiment, it may be built into the camera 200A. That is, the flash 100A and the camera 200A need only have at least an interface for communicating with each other. Reference numerals 101A to 101C denote display/operation units of the flashes, which are used to make various settings associated with light emission or to display data; and 201A, a display/operation unit of the camera, which is used to control a release operation, make a setting of switching a camera shooting mode, and display data, and can also display the information of the slave flashes and the like.

Although FIG. 3 shows the two slave flashes, one flash or three or more flashes may be used.

An operation according to the first embodiment of the present invention will be described below with reference to FIGS. 4A, 4B, 5A and 5B.

(1) Mast Flash Control

The control operation of the flash 100A serving as a master flash communicably connected with the camera 200A via the interface 104 will be explained first with reference to FIGS. 4A and 4B.

In step S101, the master flash starts charging itself while transmitting charging incompletion information to the camera via the interface 104. Charging control is managed independently of the flowchart. Upon completion of the charging, the charging control ends. The camera displays, on the display/operation unit 201A, information indicating that the charging operation of a multiple flash system is not complete.

In step S102, the master flash sends a state communication start instruction to each slave flash. By receiving a state communication signal from each of the flashes 100B and 100C, the master flash recognizes the network configuration of the multiple flashes. The master flash acquires the states by receiving network information from each slave flash (to be described later) using the wireless communication unit 105, and recognizing the state of each slave flash in the network of itself using the flash control unit 103.

In step S103, the master flash receives information such as charging state information from each slave flash. If the master flash can acquire information, it sets the number of slave flashes to be controlled in step S104. In step S105, the master flash determines whether the charging operations of the slave flashes the number of which has been set are complete. If the charging operation of at least one flash is not complete, the process returns to step S102 to repeat the same operation until the charging operations of all the flashes are completed.

If it is determined in step S105 that the charging operations of all the flashes which have been set in step S104 are complete, the process advances to step S106. In step S106, the master flash uses the wireless communication unit 105 to transmit, to each slave flash on the current network, a communication signal to stop communication of the charging state information (an example of the second transmission operation). With this processing, transmission of the charging state information to the network stops.

In step S107, the master flash determines whether the charging operation of itself is complete. If the charging operation of the master flash itself is complete, the process advances to step S108; otherwise, the process returns to step S107 to repeat the operation until the charging operation of the master flash itself is completed. In this embodiment, assume that the master flash and the slave flashes emit light. Only the slave flashes, however, may emit light. If only the slave flashes emit light, it is not necessary to execute the master flash charging completion determination processing in step S107.

In step S108, the master flash informs, via the interface 104, the camera that the charging operation of the multiple flash system is complete. The camera displays, on the display/operation unit 201A, information indicating that the charging operation of the multiple flash system is complete. The master flash also informs the slave flashes that the charging operation of the multiple flash system is complete.

In step S109, the master flash checks whether it has received connection information from a slave flash. This is done for detecting the network state because it may have changed if a slave flash was powered on or settings were changed after step S106. If a communication signal is received from a slave flash, the network configuration has changed, and thus the process returns to step S101 to restart checking the charging state of each slave flash.

In step S110, the master flash checks whether it has received a shooting instruction from the slave flash. If the master flash has received a shooting instruction, the process advances to step S111 to transmit shooting instruction information to the camera via the interface 104; otherwise, the process advances to step S112.

In step S112, the master flash checks whether it has received a light emission instruction from the camera. If the master flash has received a light emission instruction (an example of the third transmission operation), it transmits a light emission control instruction to the slave flashes using the wireless communication unit 105 in step S113. In step S114, the master flash performs a light emission control operation by sending a light emission instruction from the flash control unit 103 to the light emitting circuit 102. If the master flash has received no light emission instruction, the process returns to step S109.

Note that in the above-described processing, the master flash does not inform the camera that the charging is complete unless the charging operations of all the flashes are complete. This is because if the charging operation of at least one flash is not complete, the multiple flash system is considered not to be ready.

In the above-described processing, after the charging operations of all the flashes are completed, the master flash transmits, to each slave flash, an instruction to stop communication of the charging state information. Some reasons for this will be described in detail below.

Figure 6:
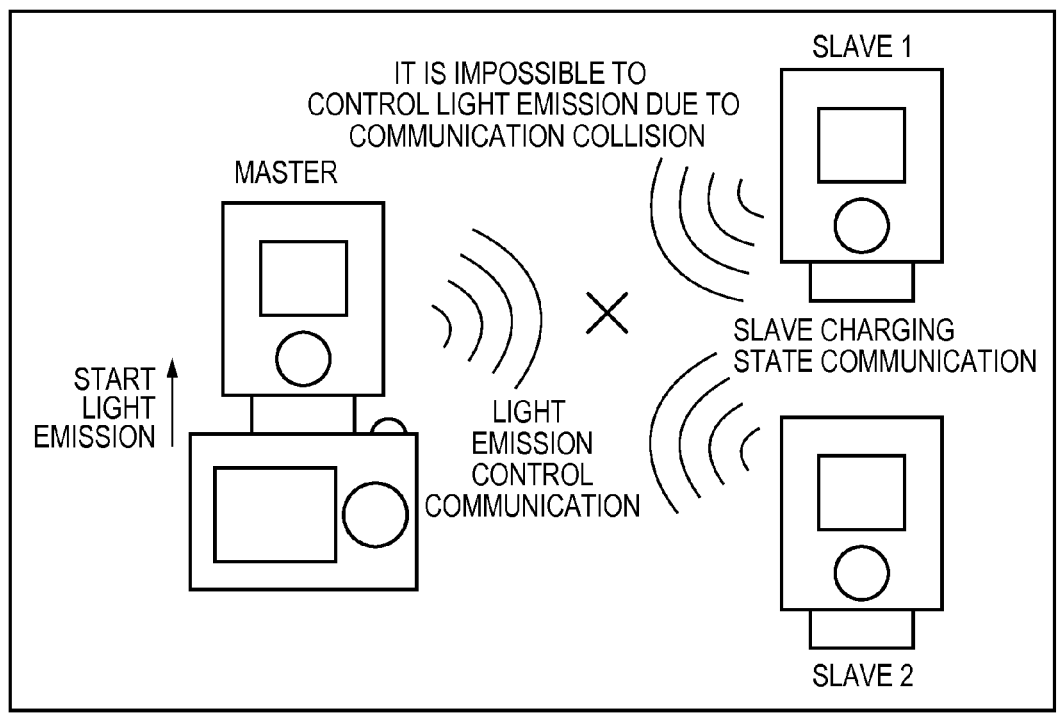
FIG. 6 is a schematic view showing charging state management/light emission control in the wireless multiple flash system.

FIG. 6 is a schematic view showing a case in which the master flash transmits a light emission command to each slave flash under the assumption that each slave flash regularly transmits the charging state information even after the charging operation is completed. Assuming the case in FIG. 6, the light emission command of the master flash may collide with the charging state information of each slave flash on a transmission line, thereby causing a communication failure.

Figure 4A:
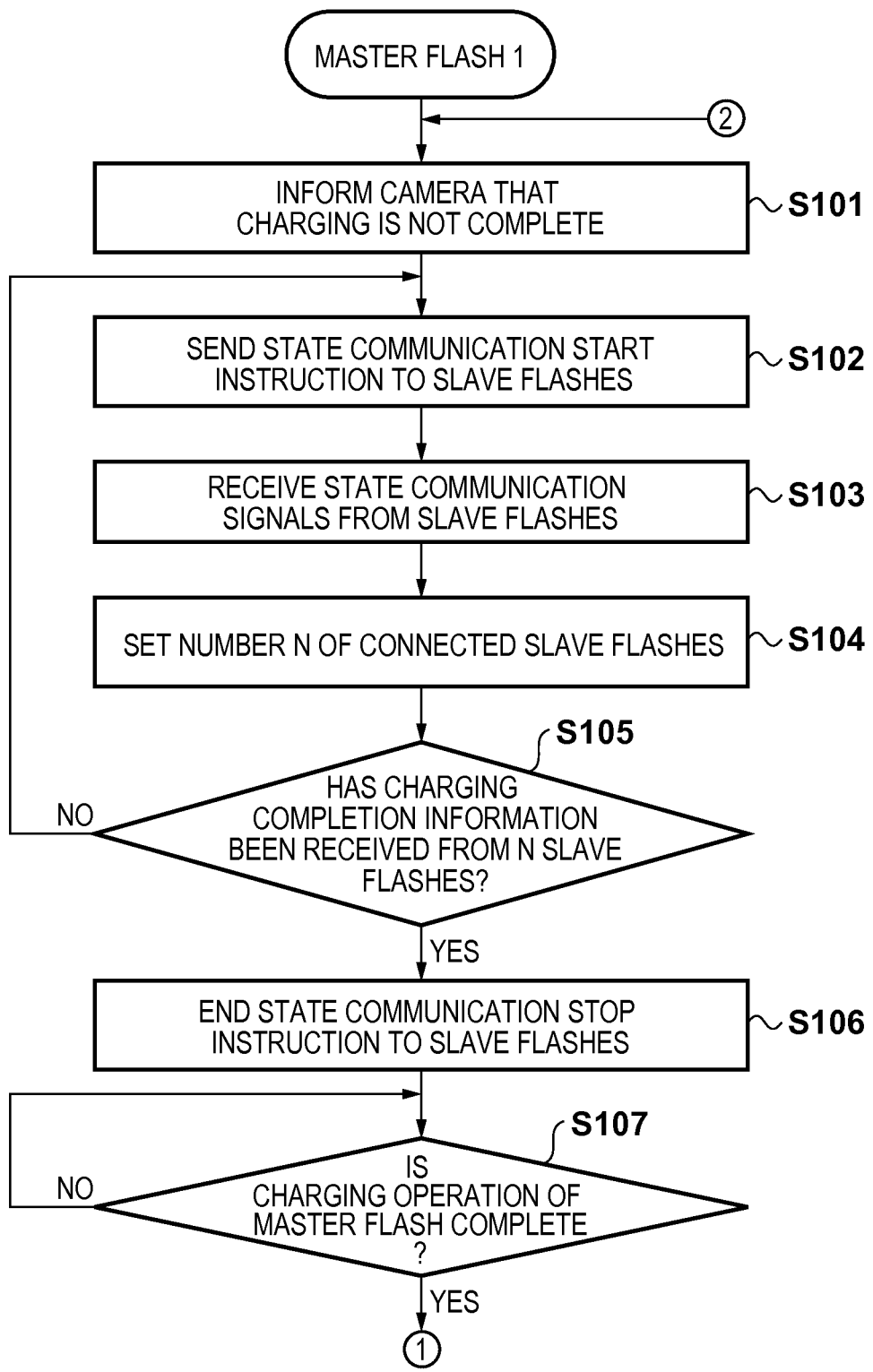
FIGS. 4A and 4B are flowcharts illustrating the control operation of the master flash according to the first embodiment.
Figure 4B:
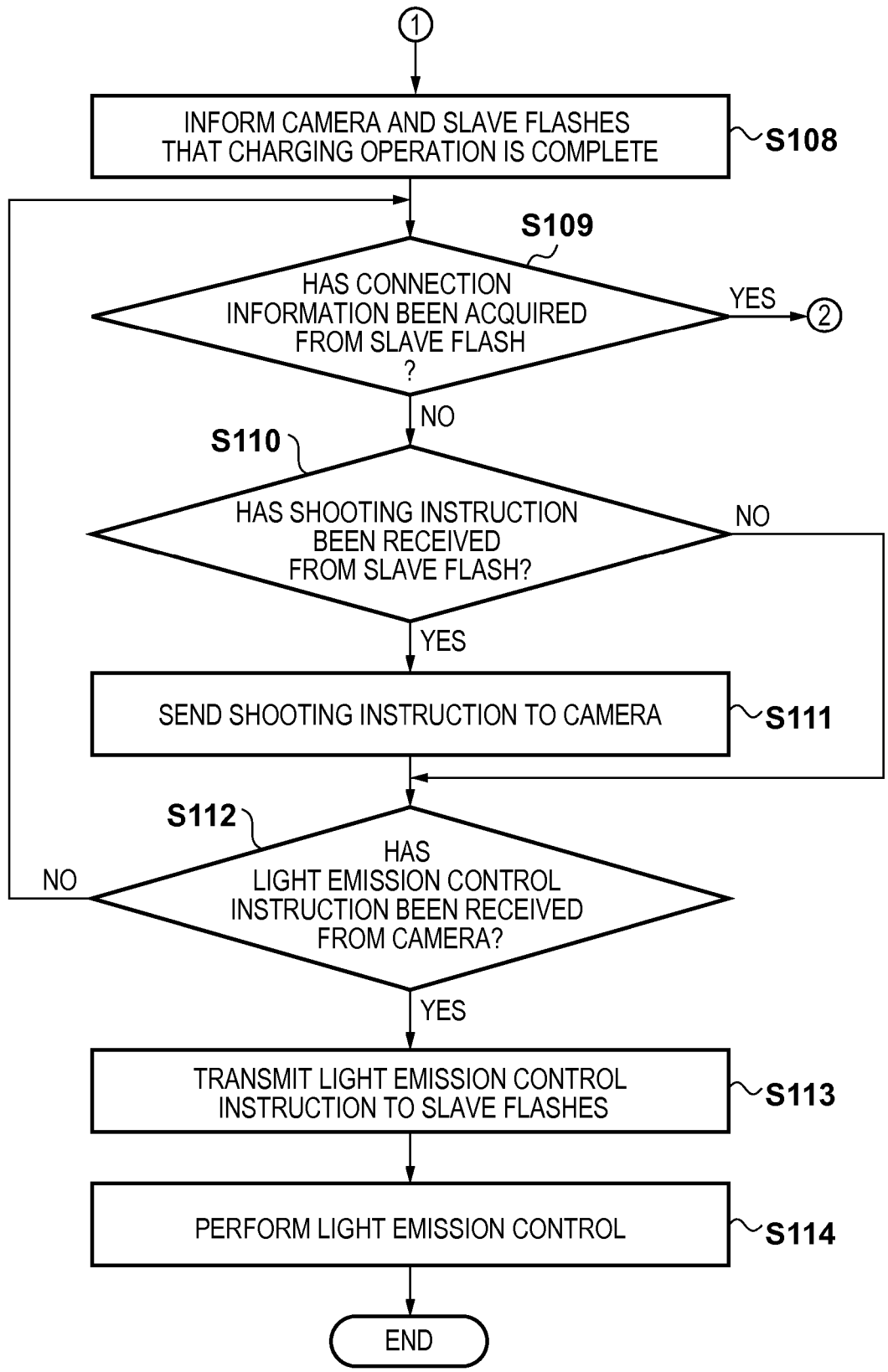

To prevent such a situation, in the processing shown in FIGS. 4A and 4B, the master flash transmits, to each slave flash, an instruction to stop communication of the charging state information after the charging operations of all the flashes are completed. In particular, timing control requirements are often severe. For example, a light emission command needs to be synchronous with a release operation, and retransmission processing, therefore, may be useless. To prevent a communication collision itself, the above-described processing is executed.

(2) Slave Flash Control

Figure 5A:
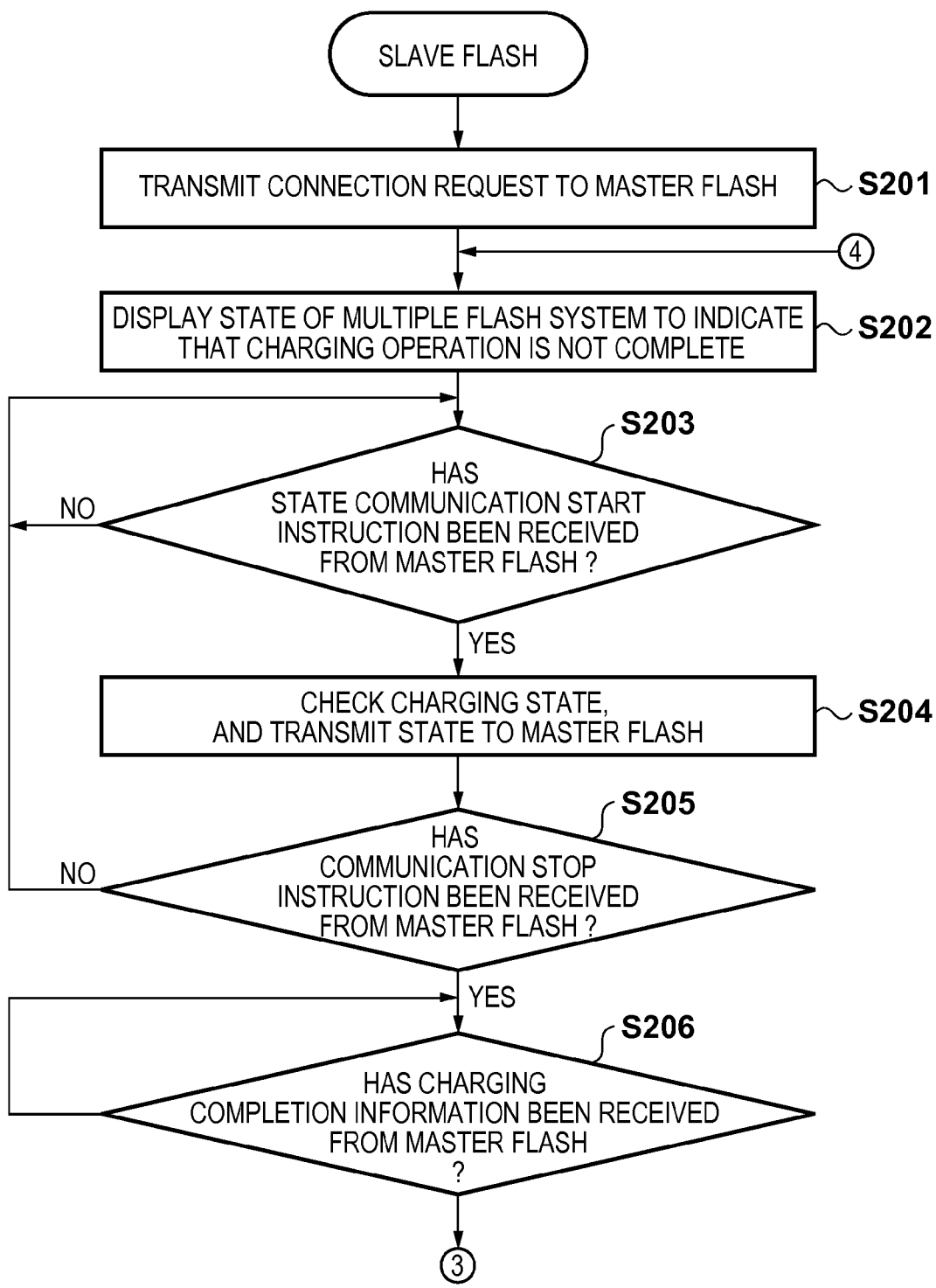
FIGS. 5A and 5B are flowcharts illustrating the control operation of the slave flash according to the first embodiment.
Figure 5B:
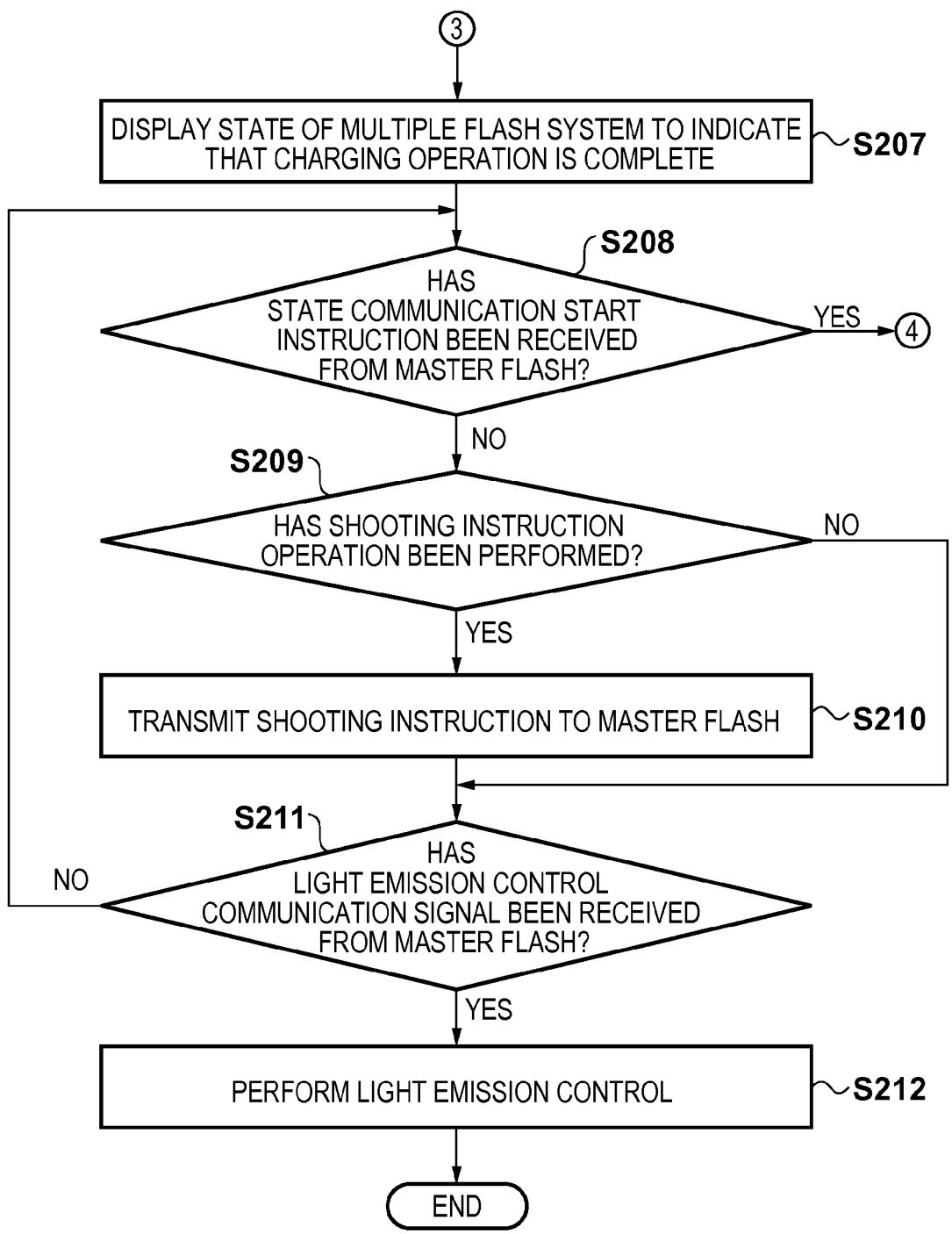

The control operation of the flash 100B or 100C to undergo light emission control by the master flash 100A will be described with reference to FIGS. 5A and 5B.

In step S201, the slave flash sends a connection request communication signal to the master flash.

In step S202, the slave flash starts charging itself while displaying, on the display/operation unit 101, information indicating that the charging operation of the multiple flash system is not complete. Charging control is managed independently of the flowchart. Upon completion of the charging, the charging control ends.

In step S203, the slave flash stands by for reception of a state communication start instruction from the master flash. Upon receiving the instruction, the slave flash checks its own charging state information, and transmits network information and the charging state information to the master flash using the wireless communication unit 105 in step S204. The network information indicates a network to which the slave flash belongs, and is information such as an ID for proving that the slave flash belongs to the same network. The charging state information is information about charging of a capacitor for causing a flash to emit light, which may be simple information indicating whether charging is complete, or detailed information indicating a charging percentage.

After transmitting the state information in step S204, the slave flash checks in step S205 whether it has received a communication signal to stop state transmission from the master flash. If the slave flash has received no communication signal, the process returns to step S203 to repeat state transmission. Note that the slave flash receives the communication signal from the master flash using the wireless communication unit 105.

Upon receiving an information transmission stop instruction from the master flash in step S205 (after transmission), the slave flash stops transmitting the information to the master flash, and prepares for light emission control so as to receive a communication signal for light emission control.

In step S206, the slave flash determines whether it has received multiple flash system charging completion information from the master flash. If the slave flash has received the information, the process advances to step S207; otherwise, the process returns to step S206 to stand by for transmission of multiple flash system charging completion information from the master flash.

In step S207, the slave flash enables the shooting instruction unit (image capture instruction unit) of the display/operation unit 101, and also displays information indicating that the charging operation of the multiple flash system is complete. This allows the operator of the slave flash to check the charging state of the multiple flash system.

In step S208, the slave flash determines whether it has received a state communication start instruction from the master flash. If the slave flash has received no instruction, the process advances to step S209; otherwise, the process returns to step S202 to perform the control operation again. This is done because it becomes necessary to reconstruct the network of the multiple flash system if the settings of the master flash or the other slave flash are changed.

In step S209, the slave flash checks whether a shooting instruction operation has been performed through the display/operation unit 101. If a shooting instruction operation has been performed, the process advances to step S210; otherwise, the process advances to step S211. In step S210, the slave flash transmits a shooting instruction to the master flash using the wireless communication unit 105. The master flash receives the shooting instruction communication signal in step S110 of FIG. 4B, and executes a predetermined operation.

After that, in step S211, the slave flash checks whether it has received a communication signal for a light emission instruction from the master flash. If the slave flash has received the communication signal, in step S212 it causes the flash control unit 103 to control the light emitting circuit 102 based on the light emission instruction received from the master flash.

In this embodiment, because the operation of the display/operation unit 101 is always valid, a change in network state such as changing the ID or leaving the network may be instructed during the processing in steps S201 to S211. In this case, the process returns to step S201 to perform the control operation again. By communicating a connection request with the master flash in step S201, the slave flash causes the master flash to reconstruct the network of the multiple flash system.

With the above control method, the states of the slave flashes are recognized and the user is informed of them. In addition, it is possible to prevent the light emission control of the slave flashes from failing due to a collision between shooting control communication in shooting and state acquisition communication from the slave flashes.

Furthermore, by checking the network configuration in steps S102 to S104, and repeatedly checking the network configuration in step S109 even after a communication stop instruction is sent, it becomes possible to more flexibly address the network which changes due to an increase/decrease in number of slave flashes.

In this embodiment, upon receiving multiple flash system charging completion information from the master flash in step S206, the slave flash enables the shooting instruction unit of the display/operation unit 101 in step S207. The slave flash, however, may accept a shooting instruction irrespective of whether it has received a communication signal from the master flash. That is, even if a shooting instruction is sent through the display/operation unit 101 of the slave flash when the multiple flash system is in a charging incompletion state, the slave flash transmits a shooting instruction to the master flash. In this case, the display/operation unit 101 of the slave flash or master flash may display a warning that a shooting instruction has been sent when the multiple flash system is in a charging incompletion state. Furthermore, the master flash may communicate with the camera to display a warning on the display/operation unit 201A of the camera.

Note that in addition to the wireless system including a plurality of flashes, it is possible to solely use the master flash connected with the camera by switching the mode or the like. In this case, when the charging operation of the master flash itself is completed, the master flash informs the camera of it. Furthermore, the master flash need not have a function of emitting light, and need only have a function of communicating with the slave flashes to control them.

(Second Embodiment)

Figure 7:
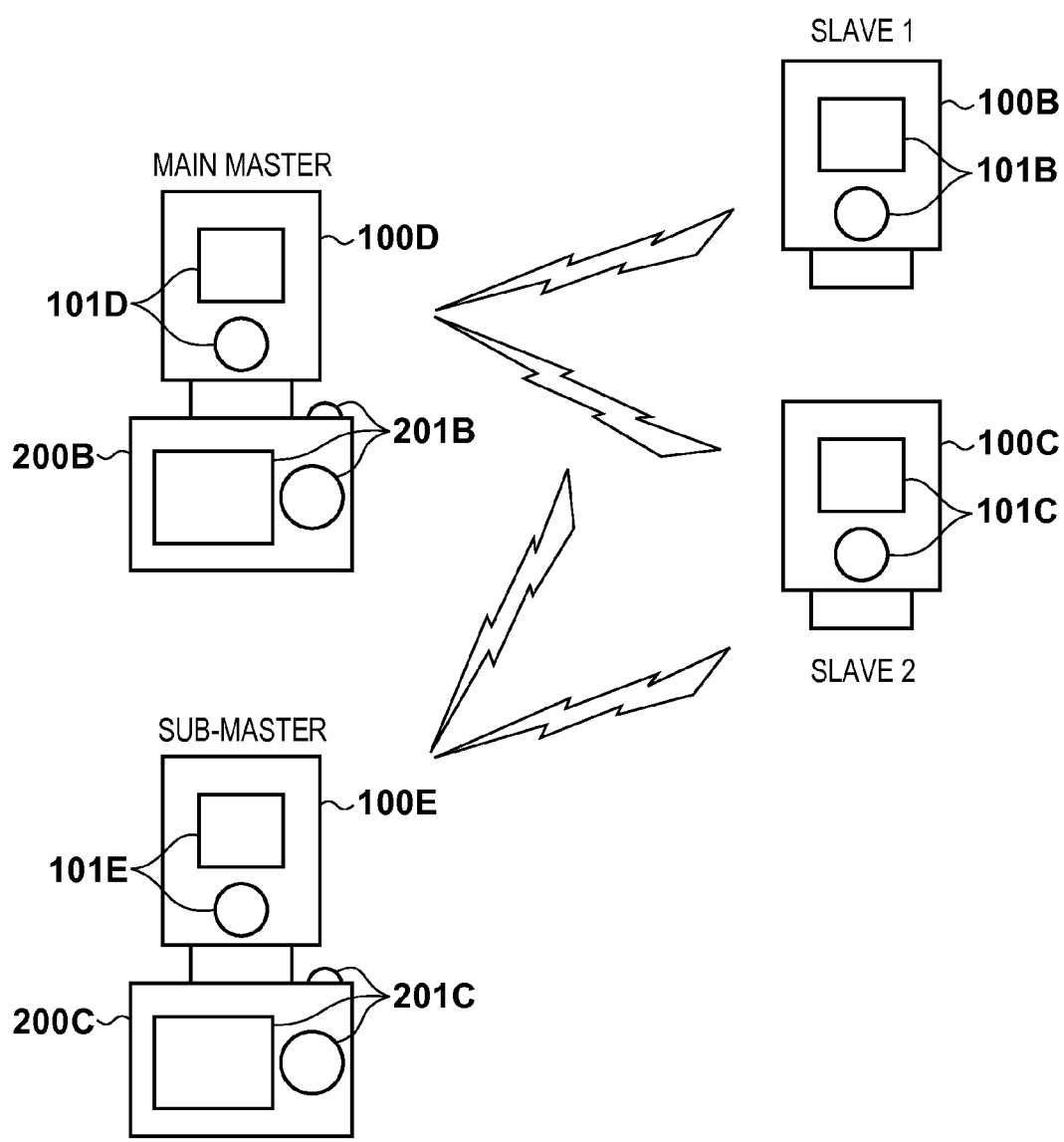
FIG. 7 is a view showing the arrangement of cameras, a main master flash, a sub-master flash, and slave flashes according to the second embodiment.

FIG. 7 is a schematic view showing a system in which flashes 100D and 100E are wirelessly connected with flashes 100B and 100C according to the second embodiment. The flash 100D serves as a main master flash, the flash 100E serves as a sub-master flash, and the flashes 100B and 100C serve as slave flashes. A camera 200B and the flash 100D are physically interconnected, and are communicable with each other. A camera 200C and the flash 100E are physically interconnected, and are communicable with each other.

The main master flash 100D can manage the network of the sub-master flash and the slave flashes, and send a light emission instruction to the slave flashes. The sub-master flash 100E can send a light emission instruction to the slave flashes.

Note that although FIG. 7 shows the one sub-master flash, a plurality of sub-master flashes may be included. Note also that although FIG. 7 shows the two slave flashes, one slave flash or three or more slave flashes may be used. That is, it is possible to build a system in which one main master flash, M sub-master flashes, and N slave flashes (M and N are natural numbers of 1 or larger).

Figure 8:
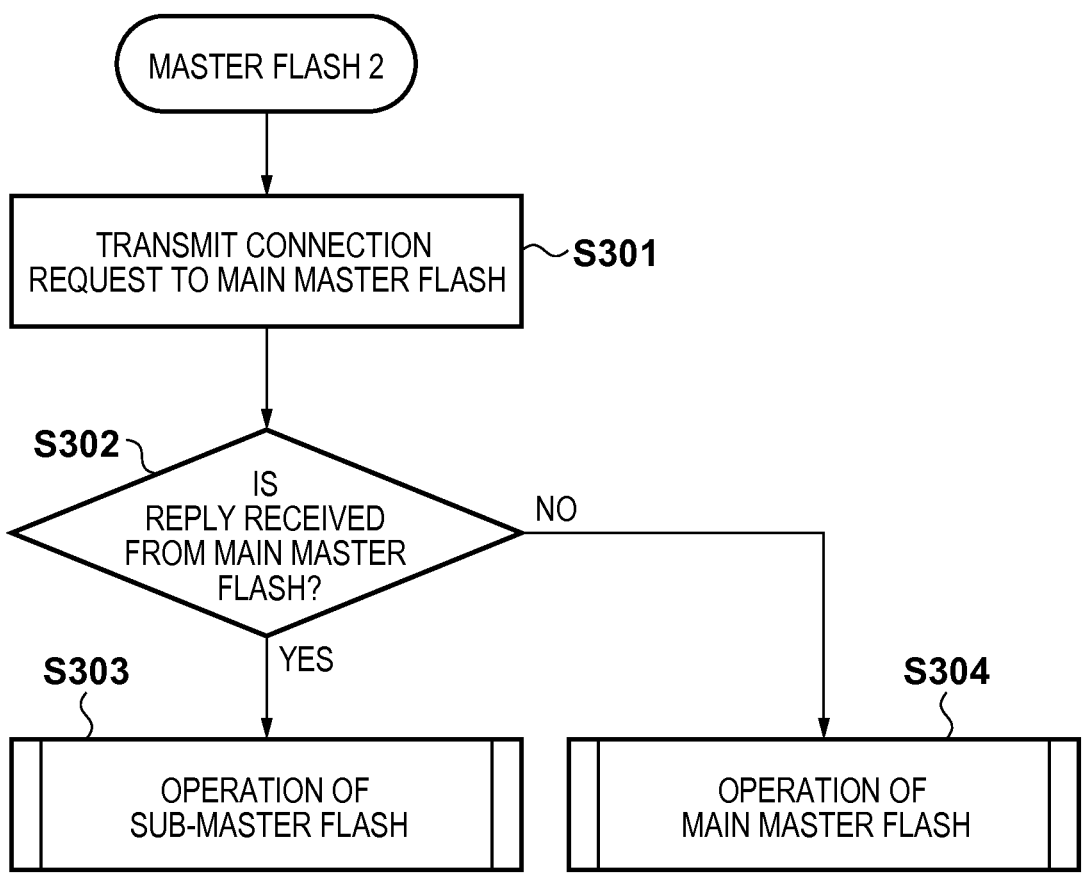
FIG. 8 is a flowchart illustrating the control operation of a master flash according to the second embodiment.

The operation of the slave flash is the same as that in the first embodiment, and a description thereof will be omitted. The control operations of the main master flash and sub-master flash will be explained. An operation according to the second embodiment of the present invention will be described below with reference to FIGS. 8 to 10.

(1) Master Flash Control

In the second embodiment, a master flash performs the operation of a main master flash or sub-master flash. Switching the operation will be described with reference to FIG. 8.

A master flash transmits a connection request to a main master flash in step S301, and checks the presence/absence of a reply in step S302. If the main master flash already exists, a reply to the connection request communication signal is received, and this flash serves as a sub-master flash (step S303). If no reply to the connection request communication signal is received, this flash serves as a main master flash (step S304).

(1-1) Main Master Flash Control

Figure 9A:
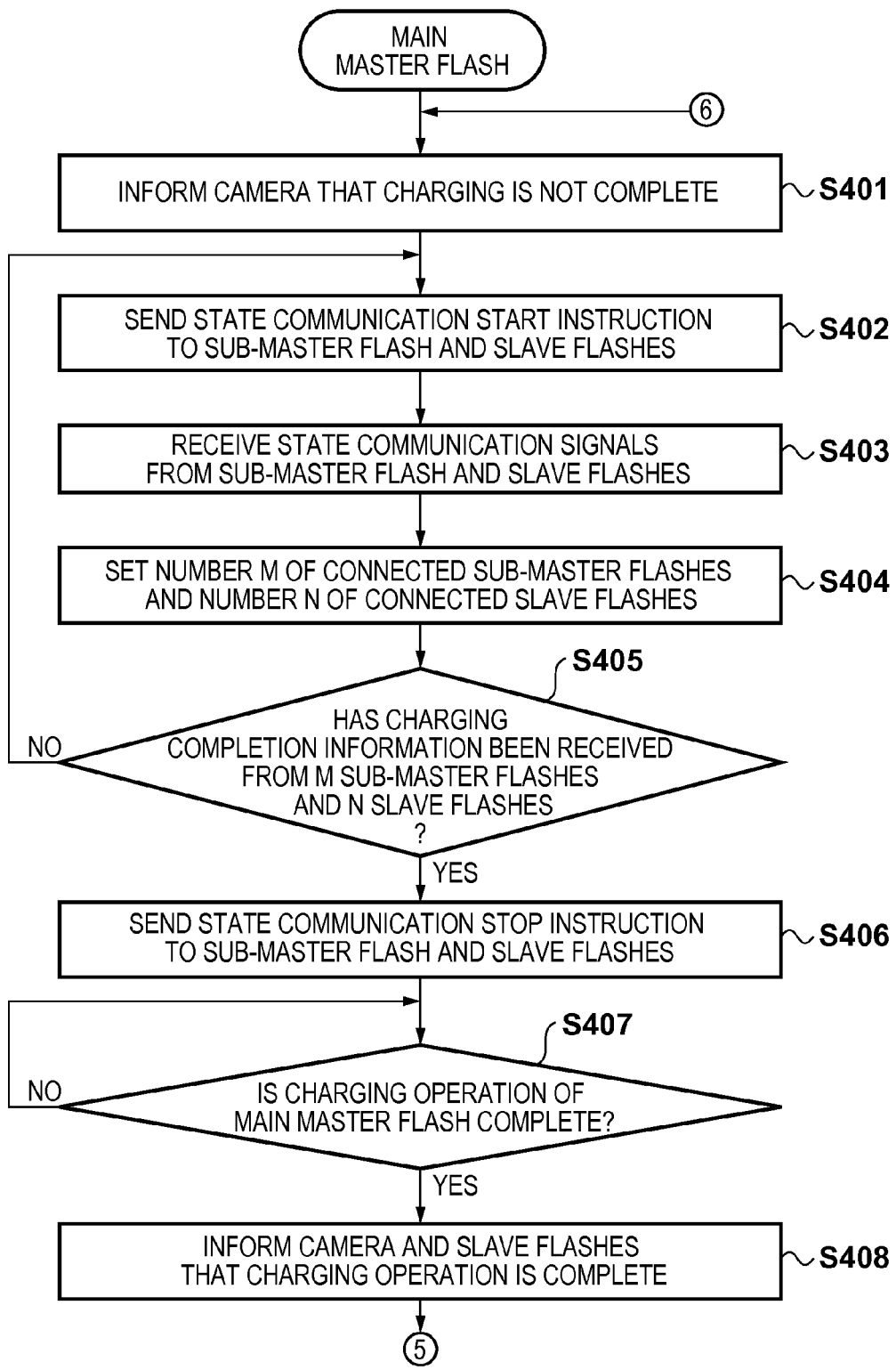
FIGS. 9A and 9B are flowcharts illustrating the control operation of the main master flash according to the second embodiment.
Figure 9B:
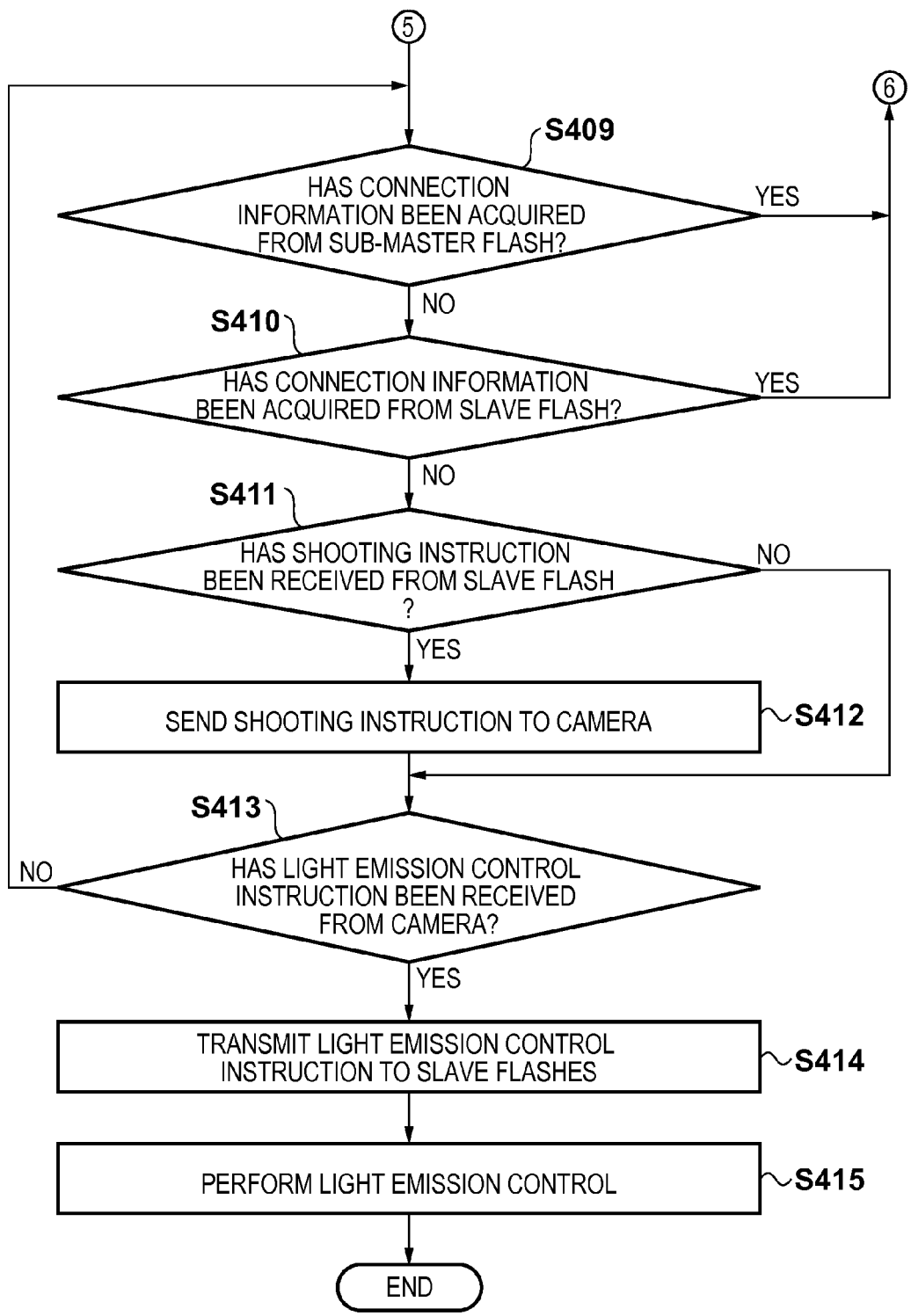

The control operation of the main master flash will be described with reference to FIGS. 9A and 9B. In step S401, the main master flash transmits charging incompletion information to the camera via an interface 104, and also starts charging itself. Charging control is managed independently of the flowchart. Upon completion of the charging, the charging control ends. The camera displays, on a display/operation unit 201B, information indicating that the charging operation of a multiple flash system is not complete.

In step S402, the main master flash sends a state communication start instruction to the sub-master flash and slave flashes. By receiving state communication signals from the sub-master flash 100E and the slave flashes 100B and 100C, the main master flash recognizes the network configuration of the multiple flashes. The main master flash acquires the states by receiving network information from the sub-master flash and slave flashes (to be described later) using a wireless communication unit 105, and recognizing the states of the slave flashes in the network of itself using a flash control unit 103.

In step S403, the main master flash receives charging state information and the like from each of the sub-master flash and slave flashes. If the main master flash can acquire information, it sets the number of sub-master flashes and that of slave flashes to be controlled in step S404. In step S405, the main master flash determines whether the charging operations of the slave flashes the number of which has been set are complete. Furthermore, the sub-master flash also transmits the charging state information of slave flashes recognized by itself. Based on this information, the main master flash determines whether the sub-master flash has also recognized that the charging operations of the slave flashes are complete. This is done not to advance to next processing if only the main master flash recognizes that the charging operations of the slave flashes are complete and the sub-master flash does not recognize it due to a communication failure or the like.

In this embodiment, the system including the cameras and flashes has been exemplified. The present invention, however, is not limited to this, and may be applied to, for example, a system in which a plurality of slave cameras perform an image capture operation in response to an image capture instruction from a master camera. In this case, each slave camera transmits its status information to the master camera. When all the slave cameras are ready to capture an image, the master camera instructs each slave camera to stop transmission of the status information.

In step S405, if the charging operation of at least one flash is not complete, the process returns to step S402 to repeat the same operation until completion of the charging operation is confirmed.

If it is determined in step S405 that the charging operations of all the slave flashes set in step S404 are complete, and the sub-master flash also recognizes completion of the charging operations of the slave flashes, the process advances to step S406. In step S406, the main master flash uses the wireless communication unit 105 to transmit, to each of the slave flashes and the sub-master flash on the current network, a communication signal to stop communication of the charging state information. This is done to prevent a collision between a light emission command and the charging state information, as described in the first embodiment.

In step S407, the main master flash determines whether the charging operation of itself is complete. If the charging operation of the main master flash itself is complete, the process advances to step S408; otherwise, the process returns to step S407 to repeat the operation until the charging operation of the main master flash itself is completed. In this embodiment, assume that the main master flash and the slave flashes emit light. Only the slave flashes, however, may emit light. If only the slave flashes emit light, it is not necessary to execute the main master flash charging completion determination processing in step S407.

In step S408, the main master flash informs, via the interface 104, the camera that the charging operation of the multiple flash system is complete. The camera displays, on the display/operation unit 201B, information indicating that the charging operation of the multiple flash system is complete. The main master flash also informs the slave flashes that the charging operation of the multiple flash system is complete.

In step S409, the main master flash checks whether it has received connection information from a master flash. If a new master flash is added to the network, it sends a connection request to the main master flash in step S301. The main master flash sends a reply, and returns the process to step S401 to reconstruct the network to which the sub-master flash has been added.

In step S410, the main master flash checks whether it has received a communication signal from a slave flash. This is done because the network state may have changed if a slave flash was powered on or settings were changed after step S406. If a slave flash has sent a communication signal, the network configuration has changed, and thus the process returns to step S401 to restart checking the charging states of the slave flashes.

In step S411, the main master flash checks whether it has received a shooting instruction from the slave flash. If the main master flash has received a shooting instruction, the process advances to step S412 to transmit shooting instruction information to the camera via the interface 104; otherwise, the process advances to step S413.

In step S413, the main master flash checks whether it has received a light emission instruction from the camera. If the main master flash has received a light emission instruction, it transmits a light emission control instruction to the slave flashes using the wireless communication unit 105 in step S414. In step S415, the main master flash performs a light emission control operation by sending a light emission instruction from the flash control unit 103 to a light emitting circuit 102. If the main master flash has received no light emission instruction, the process returns to step S409.

(1-2) Sub-Master Flash Control

Figure 10A:
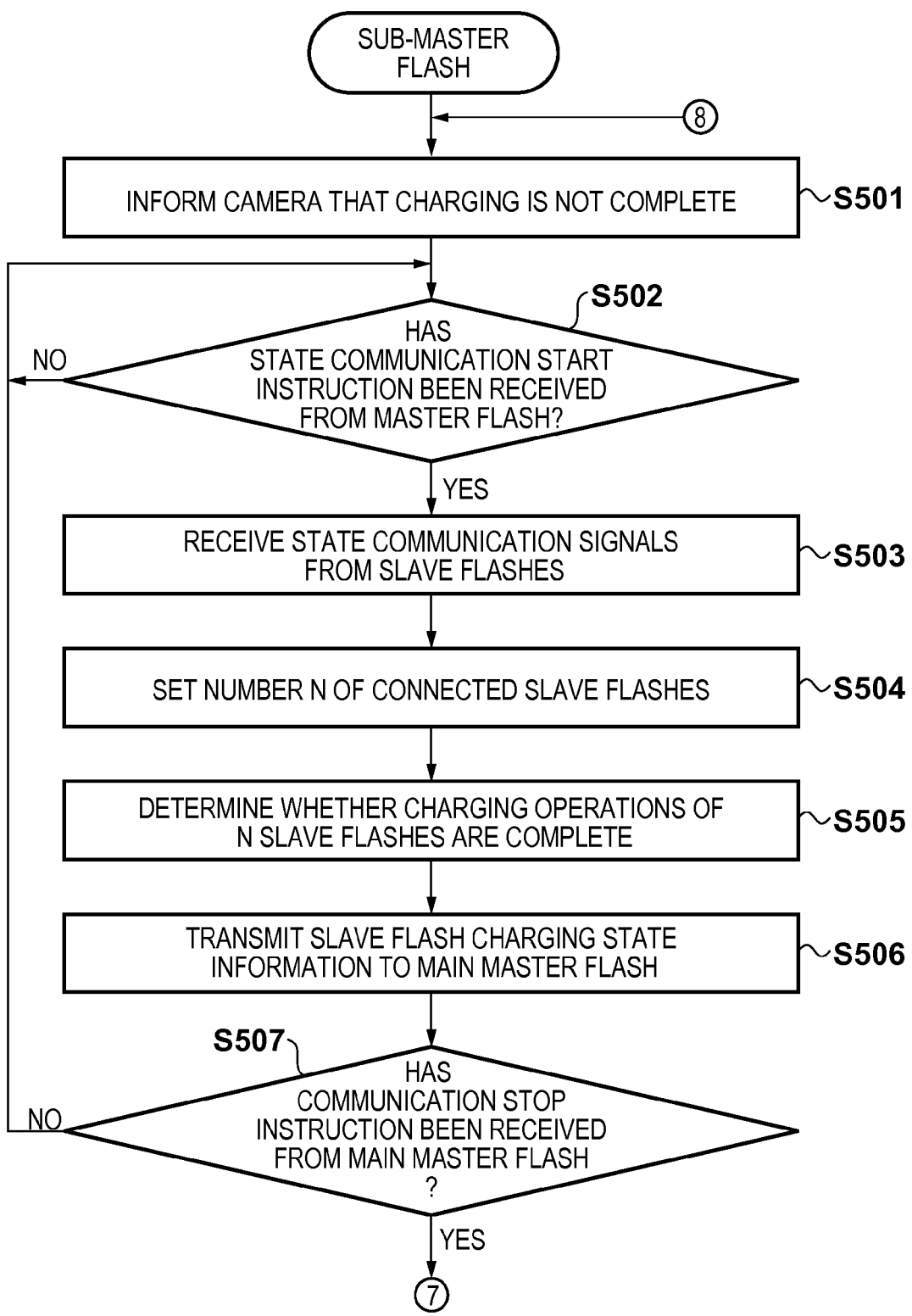
FIGS. 10A and 10B are flowcharts illustrating the control operation of the sub-master flash according to the second embodiment.
Figure 10B:
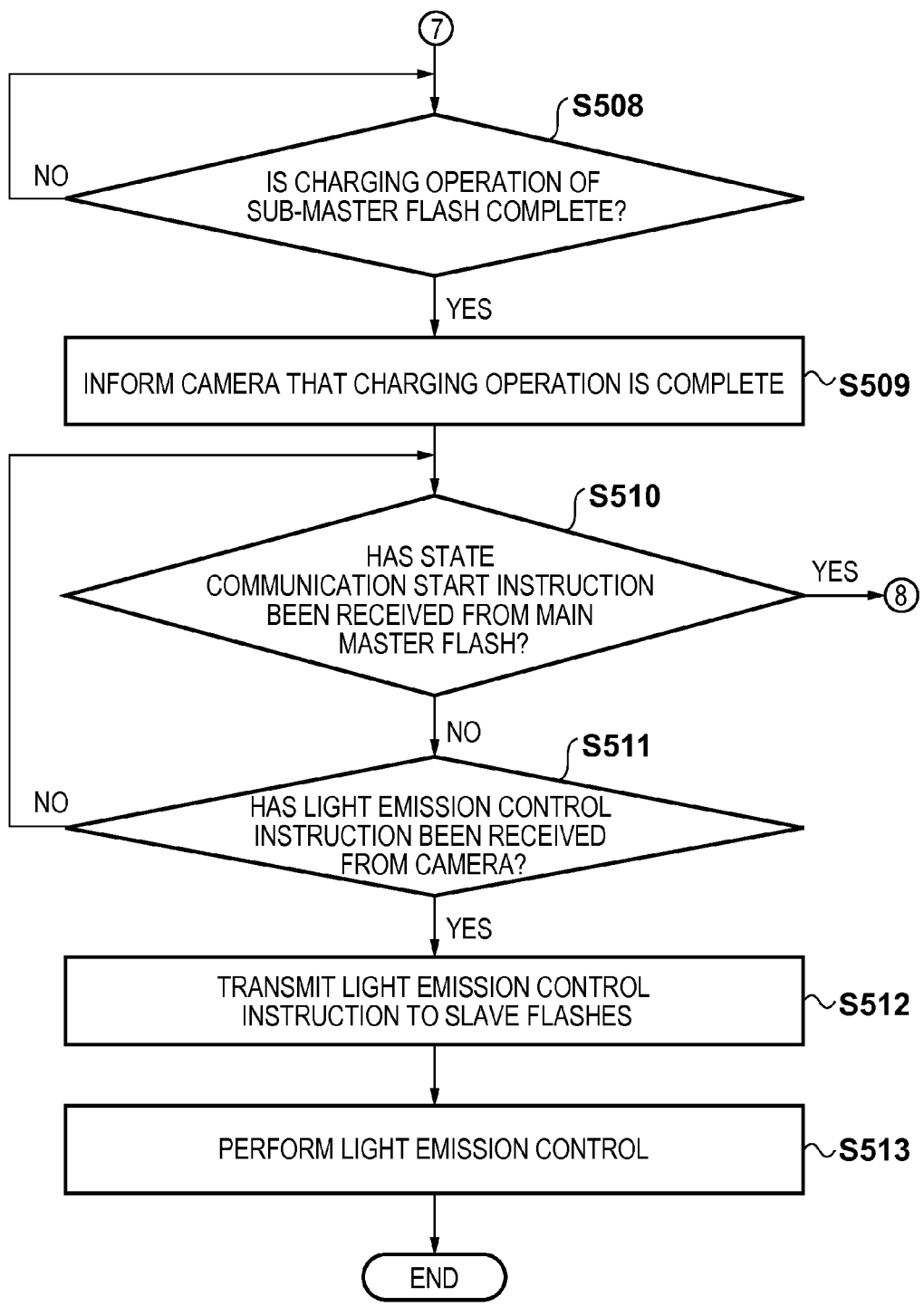

The control operation of the sub-master flash will be described with reference to FIGS. 10A and 10B. In step S501, the sub-master flash starts charging itself while transmitting charging incompletion information to the camera via the interface 104. Charging control is managed independently of the flowchart. Upon completion of the charging, the charging control ends. The camera displays, on a display/operation unit 201C, information indicating that the charging operation of the multiple flash system is not complete.

In step S502, the sub-master flash stands by for reception of a state communication start instruction from the master flash. If the sub-master flash receives the instruction, it receives information such as charging state information from each slave flash in step S503. If the sub-master flash acquires the information, it sets the number of slave flashes to be controlled in step S504. In step S505, the sub-master flash determines whether the charging operations of the slave flashes the number of which has been set are complete. In step S506, the sub-master flash transmits a determination result to the main master flash. This is done to inform the main master flash that the sub-master flash has also correctly received charging state information from each slave flash, as described above. In step S507, the sub-master flash checks whether it has received a communication signal to stop state transmission from the main master flash. If the sub-master flash has received no communication signal, the process returns to step S502 to repeat the operation of checking the charging states of the slave flashes and that of transmitting a determination result to the main master flash.

Upon receiving an information transmission stop instruction from the master flash in step S507, the sub-master flash stops transmitting the information to the master flash, and advances the process to step S508.

In step S508, the sub-master flash determines whether the charging operation of itself is complete. If the charging operation of the sub-master flash itself is complete, the process advances to step S509; otherwise, the process returns to step S508 to repeat the operation until the charging operation of the sub-master flash itself is completed. This embodiment assumes that the sub-master flash and the slave flashes emit light. Only the slave flashes, however, may emit light. If only the slave flashes emit light, it is not necessary to execute the sub-master flash charging completion determination processing in step S508.

In step S509, the sub-master flash informs, via the interface 104, the camera that the charging operation is complete. The camera displays, on the display/operation unit 201C, information indicating that the charging operation of the multiple flash system is complete.

In step S510, the sub-master flash determines whether it has received a state communication start instruction from the main master flash. If the sub-master flash has received no instruction, the process advances to step S511; otherwise, the process returns to step S501 to perform the control operation again. This is done because the main master flash transmits a state communication start instruction when the settings of the slave flashes are changed and it thus becomes necessary to reconstruct the network of the multiple flash system.

In step S511, the sub-master flash checks whether it has received a light emission instruction from the camera. If the sub-master flash has received a light emission instruction, it transmits a light emission control communication signal to the slave flashes using the wireless communication unit 105 in step S512. In step S513, the sub-master flash performs a light emission control operation by sending a light emission instruction from the flash control unit 103 to a light emitting circuit 102. If the sub-master flash has received no light emission instruction, the process returns to step S510.

With the above control method, the states of the slave flashes are recognized and the user is informed of them. In addition, it is possible to prevent the light emission control of the slave flashes from failing due to a collision between shooting control communication in shooting and state acquisition communication from the sub-master flash and slave flashes.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-020311, filed Feb. 1, 2012 and 2012-270708, filed Dec. 11, 2012, which are hereby incorporated by reference herein in their entirety.

What is claimed is:

1. A light emitting system in which a light emission control apparatus, that is communicable with an image capture apparatus, and transmits a light emission command to at least one other light emitting apparatus, wirelessly communicates with at least one controlled light emitting apparatus that emits light in response to a light emission command from another apparatus, the controlled light emitting apparatus comprising:
a first transmission unit which wirelessly transmits predetermined state information about a predetermined state of the controlled light emitting apparatus itself to the light emission control apparatus; and the light emission control apparatus comprising:
a receiving unit which receives the predetermined state information from the controlled light emitting apparatus,
an informing unit which informs the image capture apparatus that a predetermined operation is complete,
a second transmission unit which transmits, to the controlled light emitting apparatus, a signal to stop transmitting the predetermined state information, and
a third transmission unit which transmits a light emission command to the controlled light emitting apparatus in response to an instruction from the image capture apparatus,
a fourth transmission unit which transmits, to the controlled light emitting apparatus, an instruction to start transmitting the predetermined state information, and
a detection unit which detects a change in number of controlled light emitting apparatuses that are communicating with the light emission control apparatus,
wherein if the receiving unit receives, from all controlled light emitting apparatuses, the predetermined state information indicating that a predetermined operation is complete, the informing unit informs that the predetermined operation is complete, and the second transmission unit transmits the signal to stop transmitting the predetermined state information, and wherein upon detecting the change in number of controlled light emitting apparatuses by the detection unit after the second transmission unit transmits the signal, the fourth transmission unit transmits, to the controlled light emitting apparatuses, the instruction to restart transmitting the predetermined state information.

2. A light emission control apparatus which is communicable with an image capture apparatus, and wirelessly communicates with at least one controlled light emitting apparatus for emitting light in response to a light emission command, comprising:
  a receiving unit which receives predetermined state information about a predetermined state of the controlled light emitting apparatus from the controlled light emitting apparatus;
  a first transmission unit which transmits, to the controlled light emitting apparatus, a signal to stop transmitting the predetermined state information;
  a second transmission unit which transmits a light emission command to the controlled light emitting apparatus in response to an instruction from the image capture apparatus;
  a third transmission unit which transmits, to the controlled light emitting apparatus, an instruction to start transmitting the predetermined state information; and
  a detection unit which detects a change in number of controlled light emitting apparatuses that are communicating with the light emission control apparatus,
  wherein if the receiving unit receives, from all controlled light emitting apparatuses, at least predetermined state information indicating that a predetermined operation is complete, the first transmission unit transmits the signal to stop transmitting the predetermined state information, and
  wherein upon detecting a change in number of controlled light emitting apparatuses by the detection unit after the first transmission unit transmits the signal, the third transmission unit transmits, to the controlled light emitting apparatuses, the instruction to restart transmitting the predetermined state information.

3. The apparatus according to claim 2, further comprising:
  an informing unit which informs the image capture apparatus that the predetermined operation is complete,
  wherein if the receiving unit receives, from all the controlled light emitting apparatuses, at least predetermined state information indicating that the predetermined operation is complete, the informing unit informs that the predetermined operation is complete.

4. The apparatus according to claim 3, further comprising:
  a light emitting unit, and
  a determination unit which determines a predetermined state of the light emitting unit,
  wherein if the receiving unit receives, from all the controlled light emitting apparatuses, the predetermined state information indicating that the predetermined operation is complete, and the determination unit determines that the predetermined operation of the light emitting unit is complete, the informing unit informs that the predetermined operation is complete.

5. The apparatus according to claim 2, wherein if the image capture apparatus sends an instruction, the second transmission unit transmits the light emission command to the controlled light emitting apparatuses even before receiving, from all the controlled light emitting apparatuses, at least predetermined state information indicating that the predetermined operation is complete.

6. The apparatus according to claim 2, further comprising an informing unit which causes the image capture apparatus to display a warning if an instruction is received from the image capture apparatus before receiving, from all the controlled light emitting apparatuses, at least predetermined state information indicating that the predetermined operation is complete.

7. The apparatus according to claim 3, wherein the informing unit informs that the predetermined operation is complete, and enables a capture image instruction in the image capture apparatus.

8. The apparatus according to claim 2, wherein the light emission control apparatus is attachable to an accessory shoe of the image capture apparatus.

9. The apparatus according to claim 2, wherein
  the light emission control apparatus is communicable with another light emission control apparatus,
  the receiving unit receives the predetermined state information of the controlled light emitting apparatus from the controlled light emitting apparatus, and also receives the predetermined state information of the controlled light emitting apparatus from the other light emission control apparatus, and
  if the receiving unit receives, from all the controlled light emitting apparatuses, at least predetermined state information indicating that the predetermined operation is complete, and also receives, from the other light emission control apparatus, at least predetermined state information indicating that the predetermined operations of all the controlled light emitting apparatuses are complete, the first transmission unit transmits the signal to stop transmitting the predetermined state information.

10. The apparatus according to claim 9, wherein if the receiving unit receives, from all the controlled light emitting apparatuses, at least predetermined state information indicating that the predetermined operation is complete, and also receives, from the other light emission control apparatus, at least predetermined state information indicating that the predetermined operations of all the controlled light emitting apparatuses are complete, the informing unit informs that the predetermined operation is complete.

11. A method of controlling a light emission control apparatus which is connectable with an image capture apparatus, and wirelessly communicates with at least one controlled light emitting apparatus for emitting light in response to a light emission command, the method comprising:
  receiving predetermined state information about a predetermined state of the controlled light emitting apparatus from the controlled light emitting apparatus;
  transmitting, to the controlled light emitting apparatus, a signal to stop transmitting the predetermined state information;
  transmitting a light emission command to the controlled light emitting apparatus in response to an instruction from the image capture apparatus;
  transmitting, to the controlled light emitting apparatus, an instruction to start transmitting the predetermined state information; and
  detecting a change in number of controlled light emitting apparatuses that are communicating with the light emission control apparatus,
  wherein if at least predetermined state information indicating that a predetermined operation is complete is received from all controlled light emitting apparatuses in the receiving, the signal to stop transmitting the predetermined state information is transmitted, and wherein upon detecting the change in number of controlled light emitting apparatuses in the detecting after the signal is transmitted, the instruction to restart transmitting the predetermined state information is transmitted to the controlled light emitting apparatuses.

12. A non-transitory computer-readable storage medium storing a program for causing a computer to function as each unit of a light emission control apparatus comprising:

a receiving unit which receives predetermined state information about a predetermined state of the controlled light emitting apparatus from the controlled light emitting apparatus;

a first transmission unit which transmits, to the controlled light emitting apparatus, a signal to stop transmitting the predetermined state information;

a second transmission unit which transmits a light emission command to the controlled light emitting apparatus in response to an instruction from an image capture apparatus;

a third transmission unit which transmits, to the controlled light emitting apparatus, an instruction to start transmitting the predetermined state information; and a detection unit which detects a change in number of controlled light emitting apparatuses that are communicating with the light emission control apparatus, wherein if the receiving unit receives, from all controlled light emitting apparatuses, at least predetermined state information indicating that a predetermined operation is complete, the first transmission unit transmits a signal to stop transmitting the predetermined state information, and wherein upon detecting the change in number of controlled light emitting apparatuses by the detection unit after the first transmission unit transmits the signal, the third transmission unit transmits, to the controlled light emitting apparatuses, the instruction to restart transmitting the predetermined state information.

13. The apparatus according to claim 2, wherein the predetermined operation is a charging operation.

14. The method according to claim 11, wherein the predetermined operation is a charging operation.

* * * * *